(12) United States Patent
Prasse

(10) Patent No.: US 7,339,012 B2
(45) Date of Patent: Mar. 4, 2008

(54) CROSSLINKABLE COMPOSITIONS BASED ON ORGANOSILICON COMPOUNDS

(75) Inventor: Marko Prasse, Riesa (DE)

(73) Assignee: Wacker Chemie AG, Munich (DE)

( * ) Notice: Subject to any disclaimer, the term of this patent is extended or adjusted under 35 U.S.C. 154(b) by 113 days.

(21) Appl. No.: 11/068,597

(22) Filed: Feb. 28, 2005

(65) Prior Publication Data

US 2005/0215705 A1   Sep. 29, 2005

(30) Foreign Application Priority Data

Mar. 23, 2004  (DE) ............. 10 2004 014 216

(51) Int. Cl.
*C08L 83/04* (2006.01)

(52) U.S. Cl. ............. 525/477; 524/588; 528/18; 528/34

(58) Field of Classification Search ................ None
See application file for complete search history.

(56) References Cited

U.S. PATENT DOCUMENTS

| | | | |
|---|---|---|---|
| 4,950,779 A | | 8/1990 | Wengrovius et al. |
| 5,135,980 A | * | 8/1992 | Watanabe .............. 524/496 |
| 5,282,998 A | | 2/1994 | Horn et al. |
| 5,684,110 A | * | 11/1997 | Kawamura ............. 528/15 |
| 5,807,921 A | * | 9/1998 | Hill et al. .............. 524/837 |
| 5,837,784 A | | 11/1998 | Vincent |
| 5,932,757 A | | 8/1999 | Standke et al. |
| 6,140,445 A | | 10/2000 | Su et al. |
| 6,254,811 B1 | | 7/2001 | Finger et al. |
| 6,395,856 B1 | | 5/2002 | Petty et al. |
| 2003/0008999 A1 | * | 1/2003 | Singh et al. ............ 528/18 |

FOREIGN PATENT DOCUMENTS

| | | |
|---|---|---|
| EP | 0 575 863 | 9/1996 |
| EP | 0 814 110 A1 | 12/1997 |

* cited by examiner

*Primary Examiner*—Marc S. Zimmer
(74) *Attorney, Agent, or Firm*—Brooks Kushman P.C.

(57) ABSTRACT

The invention relates to compositions based on organosilicon compounds, crosslinkable by condensation reaction, and having controllable modulus, to their preparation and to their use as sealants. The compositions contain as crosslinker(s) at least one organosiloxane containing units of the formula $$R_d X_e SiO_{(4-d-e)/2} \qquad (I)$$

where R is preferably a hydrocarbon group and X is a hydrolyzable group, d and e are 0 or small whole numbers, with the proviso that the sum of d+e is $\leq 3$, from 3 to 15 units of the formula (I) are present per molecule, at least two X radicals are present per molecule and at least one unit of the formula (I) where d=2 and e=0 is present per molecule.

20 Claims, No Drawings

CROSSLINKABLE COMPOSITIONS BASED ON ORGANOSILICON COMPOUNDS

BACKGROUND OF THE INVENTION

1. Field of the Invention

The invention relates to condensation crosslinkable compositions based on organosilicon compounds which have controllable modulus, to their preparation, and to their use as sealants.

2. Background Art

Single-component sealants which are storable with the exclusion of water and which can be vulcanized to elastomers at room temperature on ingress of water are known. These products are used in large amounts, for example, in the construction industry. These mixtures are based on polymers which are terminated by silyl groups bearing reactive substituents such as OH groups, or hydrolyzable groups such as alkoxy groups, and also generally include crosslinkers, for example alkoxysilanes.

For joint sealants in particular, it is desired that the modulus, i.e. the stress value at 100% elongation of a test specimen, is low, so that minimum forces act on the joint flanks. Another desirable property relates to the uniform curing through the sealants after the application, so that the hardness differences between the upper and lower side of the joint are minimal.

The preparation of oligomeric crosslinkers, obtainable from cohydrolysis of monomeric crosslinkers, for example according to U.S. Pat. No. 5,282,998 by means of water and acidic catalyst, or, as described in U.S. Pat. No. 4,950,779, by means of formic acid and strongly acidic catalyst, has been known for some time. U.S. Pat. No. 6,395,856 describes the reaction of vinyltrialkoxysilanes with formic acid, H-silanes or higher alcohols. In all of these products, the content of hydrolyzable groups is quite high. Also, the cleavage products and unconverted monomers have to be removed.

U.S. Pat. No. 5,837,784 describes the reaction of MQ resins with alkoxysilanes in the presence of basic catalysts, D and T units being present only to a maximum degree of 20%.

SUMMARY OF THE INVENTION

Moisture curable compositions providing elastomers having controlled modulus and uniform curing throughout the cross-section thereof employ unique hydrolyzable organopolysiloxane oligomeric crosslinkers as at least a portion of the crosslinker component.

DETAILED DESCRIPTION OF THE PREFERRED EMBODIMENT(S)

The invention provides crosslinkable compositions based on organosilicon compounds, which comprises as crosslinkers (B) at least one organosiloxane composed of units of the formula $$R_d X_e SiO_{(4-d-e)/2} \quad (I)$$

where

R may be the same or different and is a monovalent, optionally substituted hydrocarbon radical which may be interrupted by oxygen atoms, X may be the same or different and is a hydrolyzable radical, d is 0, 1, 2 or 3, preferably 1 or 2, and e is 0, 1, 2 or 3, preferably 0, 1 or 2, with the proviso that the sum of d+e is ≦3, from 3 to 15 units of the formula (I) are present per molecule, at least two X radicals are present per molecule and at least one unit of the formula (I) where d=2 and e=0 is present per molecule.

The R radicals are preferably monovalent hydrocarbon radicals having from 1 to 18 carbon atoms, more preferably alkyl radicals, vinyl radicals and phenyl radicals, most preferably, methyl radicals.

Examples of R radicals are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl radicals and methylcyclohexyl radicals; alkenyl radicals such as the vinyl, 1-propenyl, and 2-propenyl radicals; aryl radicals such as the phenyl, naphthyl, anthryl and phenanthryl radicals; alkaryl radicals such as the o-, m-, p-tolyl radicals, xylyl radicals and ethylphenyl radicals; and aralkyl radicals such as the benzyl radical, and the α- and the β-phenylethyl radicals.

Examples of X radicals are acetoxy radicals, oximato radicals and organyloxy radicals —OR$^1$ where R$^1$ is a monovalent, optionally substituted hydrocarbon radical which may be interrupted by non-adjacent oxygen atoms, for example methoxy radicals, ethoxy radicals and alkoxyethoxy radicals. Examples of R$^1$ radicals are the radicals specified for R. The X radical is preferably an organyloxy radical —OR$^1$ where R$^1$ is as defined above, more preferably a methoxy or ethoxy radical, and most preferably, the methoxy radical.

Preferably, the crosslinkers (B) are those which consist of from 3 to 10, in particular from 4 to 6, units of the formula (I), and preferably comprise compounds which are liquid at room temperature and the pressure of the surrounding atmosphere, i.e. from 900 to 1100 hPa.

The crosslinker (B) preferably has a viscosity of from 1.0 to 20 mm$^2$/s, more preferably from 2.0 to 4.0 mm$^2$/s, each at 25° C., and a flashpoint of preferably from 15 to 200° C., more preferably from 15 to 40° C., in particular of from 22 to 30° C., determined in accordance with DIN 51 755 (Abel-Pensky).

The crosslinkers (B) used in accordance with the invention may be linear, branched or cyclic, preferably linear or branched. Crosslinkers (B) are preferably compounds of the formula (II)

$$[XR_2SiO_{1/2}-]_n[X_kR_{3-k}SiO_{1/2}-]_p[R_2SiO_{2/2}-]_f\\ [X_mR_{2-m}SiO_{2/2}-]_g[X_rR_{1-r}SiO_{3/2}-]_h[SiO_{4/2}-]_i,$$

where

R and X are each as defined above, k is 2 or 3, m is 1 or 2, r is 0 or 1, n is 0 or an integer from 1 to 6, preferably from 1 to 3, p is 0 or an integer from 1 to 2, preferably from 0 to 1, f is an integer from 1 to 13, preferably from 2 to 4, g is 0 or 1, h is 0 or 1, i is 0 or 1, with the proviso that the sum of (n+p+f+g+h+i) is from 3 to 15, preferably from 3 to 10, more preferably from 4 to 6.

Examples of the crosslinkers (B) used in accordance with the invention are (MeO)SiMe$_2$O(SiMe$_2$O)$_{1-13}$SiMe$_2$(OMe),
(EtO)SiMe$_2$O(SiMe$_2$O)$_{1-3}$SiMe$_2$(OEt),
(MeO)$_2$SiMeO(SiMe$_2$O)$_{1-13}$SiMe$_2$(OMe), (MeO)$_3$SiO(SiMe$_2$O)$_{1-13}$SiMe$_2$(OMe),
(MeO)$_2$SiMeO(SiMe$_2$O)$_{1-13}$SiMe(OMe)$_2$,
(MeO)$_2$SiMeO(SiMe$_2$O)$_{1-8}$Si(OMe)$_3$, (MeO)$_3$SiO(SiMe$_2$O)$_{1-8}$Si(OMe)$_3$,
(MeO)SiMe$_2$O(SiMe$_2$O)$_{1-6}$SiMe(OSi(OMe)Me$_2$)$_2$,
(MeO)SiMe$_2$O(SiMe$_2$O)$_{1-7}$SiMe(OMe)—OSiMe$_2$(OMe),
(MeO)SiMe$_2$O(SiMe$_2$O)$_{1-6}$Si(OMe)(OSi(OMe)Me$_2$)$_2$,
(MeO)SiMe$_2$O(SiMe$_2$O)$_{1-7}$Si(OMe)$_2$—OSiMe$_2$(OMe), and
(MeO)SiMe$_2$O(SiMe$_2$O)$_{1-5}$Si(OSi(OMe)Me$_2$)$_3$, where Me is a methyl radical and Et is an ethyl radical.

In particular, the compounds (B) used in accordance with the invention are (MeO)SiMe$_2$O(SiMe$_2$O)$_{2-4}$SiMe$_2$(OMe),
(MeO)$_2$SiMeO(SiMe$_2$O)$_{2-4}$SiMe$_2$(OMe), (MeO)$_3$SiO(SiMe$_2$O)$_{2-4}$SiMe$_2$(OMe),
(MeO)$_2$SiMeO(SiMe$_2$O)$_{2-4}$SiMe(OMe)$_2$,
(MeO)$_2$SiMeO(SiMe$_2$O)$_{2-4}$Si(OMe)$_3$, (MeO)$_3$SiO(SiMe$_2$O)$_{2-4}$Si(OMe)$_3$,
(MeO)SiMe$_2$O(SiMe$_2$O)$_{1-2}$SiMe(OSi(OMe)Me$_2$)$_2$,
(MeO)SiMe$_2$O(SiMe$_2$O)$_{1-3}$SiMe(OMe)—OSiMe$_2$(OMe),
(MeO)SiMe$_2$O(SiMe$_2$O)$_{1-2}$Si(OMe)(OSi(OMe)Me$_2$)$_2$,
(MeO)SiMe$_2$O(SiMe$_2$O)$_{1-3}$Si(OMe)$_2$—OSiMe$_2$(OMe), and
(MeO)SiMe$_2$O(SiMe$_2$O)$_{1-2}$Si(OSi(OMe)Me$_2$)$_3$, where Me is a methyl radical and Et is an ethyl radical.

The crosslinkers (B) may be prepared by conventional methods useful for the preparation of organosilicon compounds, for example by a partial cohydrolysis of silanes having two hydrolyzable groups and silanes having three and/or four hydrolyzable groups. Preference is given, however, to preparing the crosslinkers (B) by equilibration of silanes which have three and/or four hydrolyzable groups with siloxanes in which at least 95% of all units are diorganosiloxy units, preferably in the presence of equilibration catalyst(s). The equilibration catalysts used may be all known acidic or basic equilibration catalysts, for example acidic or basic ion exchangers, sulfuric acid, sulfonic acid derivatives, linear phosphonitrile chlorides or their reaction products with amines, strong bases or their reaction products with siloxanes, as well as alkoxytitanates and alkoxyzirconates. Optionally, alcohols may be added during equilibration. Advantageously, the catalysts, on completion of conversion, are removed or deactivated by suitable measures, for example by ion exchange and/or filtration, or by baking-out. If desired, the thus obtained equilibrate may be separated from low molecular weight compounds, for instance by a simple distillation or by means of passing through a thin-film evaporator.

In addition to the above-described component (B), the inventive compositions may also contain all substances which are conventionally used in compositions crosslinkable by condensation reaction, for example organosilicon compounds having at least two condensable groups (A), further crosslinkers (C) which are different from component (B), catalysts (D), plasticizers (E), fillers (F), adhesion promoters (G) and additives (H).

The inventive compositions are preferably those comprising (A) organosilicon compound(s) having at least two condensable groups, (B) crosslinker(s) composed of units of the formula (I), optionally (C) further crosslinkers, (D) catalyst, optionally (E) fillers, optionally (F) adhesion promoters, optionally (G) plasticizers and optionally (H) additives.

The organosilicon compounds (A) used in accordance with the invention may be all organosilicon compounds having at least two condensable groups which are conventionally used in compositions crosslinkable by condensation reaction. They may either be pure siloxanes, i.e. ≡Si—O—Si≡ structures, or silcarbanes, i.e. ≡Si—R"—Si≡ structures where R" is a divalent hydrocarbon radical which is optionally substituted or interrupted by heteroatoms, or any copolymers having organosilicon groups.

In the context of the present invention, the term "condensable" radicals is intended also to refer to those radicals which include an optionally preceding hydrolysis step.

The organosilicon compounds (A) used in accordance with the invention are preferably those containing units of the formula

$$R^2_a(OR^3)_bY_cSiO_{(4-a-b-c)/2} \quad (III)$$

where

R$^2$ may be the same or different and is an optionally substituted hydrocarbon radical which may be interrupted by non-adjacent oxygen atoms, R$^3$ may be the same or different and is a hydrogen atom or a monovalent, optionally substituted hydrocarbon radical which may be interrupted by non-adjacent oxygen atoms, Y may be the same or different and is a halogen atom, pseudohalogen radical, Si—N-bonded amine radical, amide radical, oxime radical, aminoxy radical or acyloxy radical, a is 0, 1, 2 or 3, preferably 1 or 2, b is 0, 1, 2 or 3, preferably 0, 1 or 2, more preferably 0, and c is 0, 1, 2 or 3, preferably 0 or 1, more preferably 0, with the proviso that the sum of a+b+c is less than or equal to 4 and at least two condensable radicals (OR$^3$) are present per molecule. The sum of a+b+c is preferably less than or equal to 3.

The R$^2$ radical is preferably a monovalent hydrocarbon radical which has from 1 to 18 carbon atoms and is optionally substituted by halogen atoms, amino groups, ether groups, ester groups, epoxy groups, mercapto groups, cyano groups or (poly)glycol radicals, the latter being formed from oxyethylene and/or oxypropylene units, more preferably alkyl radicals having from 1 to 12 carbon atoms, in particular the methyl radical. However, the R$^2$ radical may also be a divalent radical which joins together, for example, two silyl groups. Examples of R$^2$ radicals are the examples specified for R radical, while examples of divalent R$^2$ radicals are polyisobutylenediyl radicals and propanediyl-terminated polypropylene glycol radicals.

Examples of R$^3$ radicals are the monovalent radicals specified for R. The R$^3$ radical is preferably a hydrogen atom or an alkyl radical having from 1 to 12 carbon atoms, more preferably a hydrogen atom, methyl radical, or ethyl radical.

Organosilicon compounds (A) used in accordance with the invention are more preferably those of the formula

(IV)

where
R$^2$ and R$^3$ are each as defined above,
v is from 30 to 3000 and
u may be the same or different and is 1 or 2, and where u is preferably 2 when R$^3$ is hydrogen, and u is 1 when R$^3$ is other than hydrogen.

Examples of organosilicon compounds (A) are
(MeO)$_2$MeSiO[SiMe$_2$O]$_{200-2000}$SiMe(OMe)$_2$,
(HO)Me$_2$SiO[SiMe$_2$O]$_{200-2000}$SiMe$_2$(OH),
(EtO)$_2$MeSiO[SiMe$_2$O]$_{200-2000}$SiMe(OEt)$_2$,
(HO)MeViSiO[SiMe$_2$O]$_{200-2000}$SiMeVi(OH),
(MeO)$_2$ViSiO[SiMe$_2$O]$_{200-2000}$SiVi(OMe)$_2$ and
(EtO)$_2$VisiO [SiMe$_2$O]$_{200-2000}$SiVi(OEt)$_2$,
where Me is the methyl radical, Et is the ethyl radical and Vi is the vinyl radical.

The organosilicon compounds (A) used in accordance with the invention preferably have a viscosity of from 100 to 10$^6$ mPas, more preferably from 10$^3$ to 350,000 mPas, in each case at 25° C. The organosilicon compounds (A) are commercial products, or can be prepared by methods common in silicon chemistry.

The inventive compositions preferably comprise crosslinkers (B) in amounts of from 1 to 30 parts by weight, more preferably from 5 to 15 parts by weight, based in each case on 100 parts by weight of component (A).

The further crosslinkers (C) which are optionally used in the inventive compositions may be any crosslinkers known hitherto which have at least three condensable radicals, for example silanes having at least three organyloxy groups, and which are different from crosslinkers (B). The further crosslinkers (C) optionally used are more preferably silane crosslinkers such as tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-cyanopropyltrimethoxysilane, 3-cyanopropyltriethoxysilane, 3-(glycidoxy)propyltriethoxysilane, 1,2-bis(trimethoxysilyl)ethane, 1,2-bis(triethoxysilyl)ethane, 3-aminopropyltrimethoxysilane, 3-(2-aminoethyl)aminopropyltrimethoxysilane, 3-(2-aminoethyl)aminopropylmethyldimethoxysilane, cyclohexylaminomethyltriethoxysilane, methyltriacetoxysilane, ethyltriacetoxysilane, methyltris(methylethylketoximo)silane and vinyltris(methylethylketoximo)silane.

The further crosslinkers (C) which are optionally used are commercial products or may be prepared by processes known in silicon chemistry. If the inventive compositions contain further crosslinkers (C), their amounts are preferably from 0.5 to 10 parts by weight, more preferably from 1 to 3 parts by weight, based in each case on 100 parts by weight of organopolysiloxane (A). The compositions preferably include additional crosslinkers (C).

Examples of catalysts (D) are the titanium compounds already known, and organic tin compounds such as di-n-butyltin dilaurate and di-n-butyltin diacetate, di-n-butyltin oxide, dioctyltin diacetate, dioctyltin dilaurate, dioctyltin oxide and reaction products of these compounds with alkoxysilanes such as tetraethoxysilane, of which preference is given to di-n-butyltin diacetate and dibutyltin oxide in tetraethyl silicate hydrolyzate, and particular preference is given to di-n-butyltin oxide in tetraethyl silicate hydrolyzate.

Catalyst(s) (D) are preferably used in amounts of from 0.01 to 3 parts by weight, more preferably from 0.05 to 2 parts by weight, based in each case on 100 parts by weight of constituent (A).

Examples of plasticizers (E) are dimethylpolysiloxanes which are end-capped by trimethylsiloxy groups and are liquid at room temperature, in particular those having viscosities at 25° C. in the range between 50 and 1000 mPas, and also high-boiling hydrocarbons, for example paraffin oils or mineral oils consisting of naphthenic and paraffinic units. Plasticizers are preferably in amounts of from 0 to 300 parts by weight, more preferably from 10 to 200 parts by weight, and in particular from 20 to 100 parts by weight, based in each case on 100 parts by weight of organopolysiloxane (A).

Examples of fillers (F) are nonreinforcing fillers, i.e. fillers having a BET surface area of up to 50 m$^2$/g, such as quartz, diatomaceous earth, calcium silicate, zirconium silicate, zeolites, metal oxide powders such as oxides or mixed oxides of aluminum, titanium, iron or zinc, barium sulfate, calcium carbonate, gypsum, silicon nitride, silicon carbide, boron nitride, glass and polymer powder, such as polyacrylonitrile powder; reinforcing fillers, i.e. fillers having a BET surface area of more than 50 m$^2$/g, such as pyrogenic silica, precipitated silica, precipitated chalk, carbon black such as furnace black and acetylene black, and silicon-aluminum mixed oxides of large BET surface area; fibrous fillers such as asbestos and polymer fibers. The fillers mentioned may be hydrophobicized, for example by the treatment with organosilanes or organosiloxanes or with stearic acid, or by etherification of hydroxyl groups to alkoxy groups. If fillers (F) are used, they are preferably hydrophilic pyrogenic silica and precipitated or ground calcium carbonate. Fillers (F) are preferably used in amounts of from 0 to 300 parts by weight, more preferably from 1 to 200 parts by weight, and in particular from 5 to 200 parts by weight, based in each case on 100 parts by weight of organopolysiloxane (A).

Examples of the adhesion promoters (G) useful in the inventive compositions are silanes and organopolysiloxanes having functional groups, for example those having glycidoxypropyl, aminopropyl, aminoethylaminopropyl, ureidopropyl or methacryloyloxypropyl radicals. The compositions preferably contain adhesion promoters (G) in amounts of from 0 to 50 parts by weight, more preferably from 1 to 20 parts by weight, and in particular from 1 to 10 parts by weight, based in each case on 100 parts by weight of organopolysiloxane (A).

Examples of additives (H) are pigments, dyes, odorants, oxidation inhibitors, agents for influencing the electrical properties such as conductive black, flame retardants, light stabilizers, agents for prolonging skin formation time such as silanes having an SiC-bonded mercaptoalkyl radical, cell-generating agents, for example azodicarbonamide, heat stabilizers and thixotropic agents, for example phosphoric esters, and organic solvents such as alkylaromatics. The compositions preferably include additives (H) in amounts of from 0 to 100 parts by weight, and more preferably from 0 to 30 parts by weight, in particular from 0 to 10 parts by weight, based in each case on 100 parts by weight of organopolysiloxane (A).

More preferably, the inventive compositions are those which consist of
(A) organosilicon compounds containing units of the formula (III),
(B) organosiloxane composed of units of the formula (I),
(C) crosslinker,
(D) catalyst, optionally (E) plasticizer,
(F) fillers, optionally
(G) adhesion promoter and optionally
(H) additives.

To prepare the inventive compositions, all constituents may be mixed with one another in any sequence. This mixing may be effected at room temperature and the pressure of the surrounding atmosphere, i.e. from about 900 to 1100 hPa. If desired, this mixing may also be effected at higher temperatures, for example at temperatures in the range of from 35 to 135° C.

The individual constituents of the inventive compositions may each be one type of such constituents or else a mixture of at least two different types of such constituents.

For the crosslinking of the inventive compositions, the typical water content of air is sufficient. The inventive compositions are preferably crosslinked at room temperature. The crosslinking may, if desired, also be carried out at temperatures higher or lower than room temperature, i.e. at from −5° to 15° C. or at from 30° to 50° C. and/or by means of concentrations of water exceeding the normal water content of air. Preference is given to carrying out the crosslinking at a pressure of from 100 to 1100 hPa, in particular at the pressure of the surrounding atmosphere.

The present invention further provides moldings produced by crosslinking the inventive compositions. The inventive compositions may be used for all purposes for which compositions which are storable with exclusion of water and crosslink to elastomers at room temperature on ingress of water can be used. The inventive compositions are thus admirably suitable, for example, as sealants for joints, including vertical joints, and for similar cavities having an internal diameter of, for example, from 10 to 40 mm, for example in buildings, land vehicles, watercraft and aircraft, or as adhesives or cementing compositions, for example in window construction or in the production of aquaria or glass cabinets and, for example, for the production of protective coatings, including those for surfaces exposed to the constant action of freshwater or seawater, friction coatings, elastomeric moldings, and for the insulation of electrical or electronic devices.

The inventive compositions have the advantage that they are easy to prepare and have a high storage stability over a long period. The compositions have the further advantages that the modulus can be adjusted selectively, and that they cure through uniformly. The freshly formed skin is elastic and the early strength is thus surprisingly high. Another advantage of the inventive compositions that drops of water or smoothing agent, i.e. water with surfactant, which have remained on the surface of the crosslinkable compositions do not leave behind a visible residue. In addition, the compositions have the advantage that the use of oligomeric crosslinker (B) distinctly reduces the evaporation of crosslinker during cure, leading to lower pollution of the environment by evaporated crosslinker, and a reduced hydrophobicization of the immediate environment.

In the examples described below, all viscosity data relate to a temperature of 25° C. Unless stated otherwise, the examples below are carried out at a pressure of the surrounding atmosphere, i.e. at about 1000 hPa, and at room temperature, i.e. at about 23° C., or at a temperature which is established without additional heating or cooling when the reactants are combined at room temperature, and at a relative atmospheric humidity of about 50%. In addition, all data of parts and percentages, unless stated otherwise, are based on weight.

Shore A hardness is determined in accordance with DIN (German industrial standard) 53505-87. To assess the uniformity of cure, the difference between the Shore A hardness of the upper and lower side of the hardness plates was also determined to DIN 53505-87. The tensile strain at break and elongation at break are both determined in accordance with DIN 53504-85 S2. The modulus is the tension value at 100% elongation.

EXAMPLE 1

500 g of octamethylcyclotetrasiloxane, 187.5 g of methyltrimethoxysilane and 0.35 g of a 40% solution of tetrabutylphosphonium hydroxide in water was stirred with the exclusion of atmospheric humidity at 120° C. for 2 hours, then cooled, and the product was neutralized with 3 g of polystyrene-based acidic ion exchange resin commercially available under the name "Purolite CT 169 DR" from Purolite GmbH, Germany, and transferred through a fine filter. 685 g of a siloxane crosslinker were obtained. The 29-Si NMR confirmed a conversion of 98% based on the silane.

Results from the 29-Si NMR analysis:
53.9% $Me_2SiO$, 25.8% $(MeO)Me_2SiO_{0.5}$, 9.9% $(MeO)MeSiO$, 3.6% $MeSiO_{0.5}$, 3.6% $(MeO)_2MeSiO_{0.5}$, 2.8% $Me_2Si(OMe)_2$, 0.4% $MeSi(OMe)_3$. The viscosity is 3.0 $mm^2/s$, the flashpoint 24° C.

330 g of a polydimethylsiloxane mixture in which the siloxanes are terminated with dimethoxymethylsilyl and/or dimethoxyvinylsilyl groups and the ratio of dimethoxymethylsilyl end groups to dimethoxyvinylsilyl end groups is about 1:1, having a viscosity of 80,000 mPa·s, 265 g of a trimethylsilyl-capped polydimethylsiloxane having a viscosity of 1000 mPa·s, 7.5 g of methyltrimethoxysilane, 51 g of the above-prepared siloxane crosslinker, 12.5 g of an adhesion promoter which is prepared by the reaction of 1 part of aminopropyltriethoxysilane with 1 part of methyltriethoxysilane hydrolyzate having an ethoxy content of 37%, and 4.5 g of aminopropyltrimethoxysilane are mixed with one another in a planetary mixer and stirred for 15 minutes. Subsequently, the mixture is completed by homogeneously mixing in 63 g of pyrogenic silica having a specific surface area of 150 $m^2/g$, 1.1 g of octylphosphonic acid, 1.4 g of a polyethylene glycol/polypropylene glycol copolymer having a viscosity of 700 mPa·s, and 2.5 g of a tin catalyst which is prepared by reacting di-n-butyltin diacetate and tetraethoxysilane.

The thus obtained composition was applied to a PE film in a thickness of 2 mm and stored at 23° C./50% rel. atmospheric humidity. After curing for 7 days, the mechanical characteristics were measured on the S2 standard bar according to DIN 53 504. The hardness was determined after 7 days of curing according to DIN 53 505. To determine the uniformity of vulcanization, the difference of the hardness between the upper and lower side was determined. The results can be found in Table 1.

COMPARATIVE EXAMPLE 1 (C1)

The procedure described in example 1 is repeated with the modification that, instead of 51 g of siloxane crosslinker, 14 g of methyltrimethoxysilane were used. The results can be found in table 1.

COMPARATIVE EXAMPLE 2 (C2)

The procedure described in example 1 is repeated with the modification that, instead of 51 g of siloxane crosslinker, 33 g of a methyltrimethoxysilane hydrolyzate having a methoxy content of 29.0% are used as the crosslinker. The results can be found in table 1.

TABLE 1

| Example | Shore A Hardness | Shore A hardness difference | Modulus N/mm² | Tensile strain at break N/mm² | Elongation at break % |
|---|---|---|---|---|---|
| 1 | 18 | 5.4 | 0.32 | 1.21 | 480 |
| C1 | 23 | 8.6 | 0.39 | 1.49 | 500 |
| C2 | 26 | 8.6 | 0.44 | 1.39 | 500 |

The comparison of example 1 with comparative example 1 shows a distinctly lower modulus and a distinctly lower hardness difference and thus a more uniform curing through the compositions as per example 1 than in comparative examples 1 and 2.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A moisture curable substantially water-free, storage-stable crosslinkable composition containing a crosslinkable polymer composition consisting essentially of one or more condensation crosslinkable polymers (A) having minimally two silicon-bonded —$OR^3$ groups wherein $R^3$ each is the same or different and is a hydrogen atom or a monovalent, optionally substituted hydrocarbon radical optionally interrupted by non-adjacent oxygen atoms; and an organosilicon crosslinker, wherein the crosslinker, comprises at least one linear or branched organosiloxane (B) comprising units of the formula $$R_d X_e SiO_{(4-d-e)/2} \quad (I)$$

where
R each is the same or different and is a monovalent hydrocarbon radical optionally interrupted by non-adjacent oxygen atoms,
X each is the same or different and is a hydrolyzable radical,
d is 0, 1, 2 or 3 and
e is 0, 1, 2 or 3,
with the proviso that the sum of d+e is ≦3 from 3 to 15 units of the formula (I) are present per molecule, at least two X radicals are present per molecule, and at least one unit of the formula (I) where d=2 and e=0 is present per molecule.

2. The crosslinkable composition of claim 1, wherein the crosslinker (B) comprises at least one compound of the formula (II)

$$[XR_2SiO_{1/2}]_n[X_kR_{3-k}SiO_{1/2}]_p[R_2SiO_{2/2}]_f[X_mR_{2-m}SiO_{2/2}]_g[X_rR_{1-r}SiO_{3/2}]_h[SiO_{4/2}]_i$$

where
k is 2 or 3,
m is 1 or 2,
r is 0 or 1,
n is 0 or an integer from 1 to 6,
p is 0 or an integer from 1 to 2,
f is an integer from 1 to 13,
g is 0 or 1,
h is 0 or 1,
i is 0 or 1,
with the proviso that the sum of (n+p+f+g+h+i) is from 3 to 15.

3. The crosslinkable composition of claim 1, wherein the X radical is an organyloxy radical —$OR^1$ where $R^1$ is a monovalent, optionally substituted hydrocarbon radical which may be interrupted by non-adjacent oxygen atoms.

4. The crosslinkable composition of claim 1, wherein crosslinkers (B) have a flashpoint of from 15 to 200° C., determined in accordance with DIN 51 755.

5. The crosslinkable composition of claim 1, comprising
    (A) organosilicon compound(s) having at least two condensable silicon-bonded $OR^3$ groups,
    (B) crosslinker comprising units of the formula (I),
    (C) optionally, further crosslinkers, and
    (D) condensation catalyst.

6. The crosslinkable composition of claim 1, which contains crosslinker(s) (B) in an amount of from 1 to 30 parts by weight, based on 100 parts by weight of component (A).

7. The crosslinkable composition as claimed in claim 1, wherein the crosslinkable polymer composition contains at least one polymer which consists of:
    (A) organosilicon compounds containing units of the formula (III), $$R^2_a(OR^3)_b Y_c SiO_{(4-a-b-c)/2} \quad (III)$$

where
$R^2$ each is the same or different and is an optionally substituted hydrocarbon radical optionally be interrupted by non-adjacent oxygen atoms,
$R^3$ each is the same or different and is a hydrogen atom or a monovalent, optionally substituted hydrocarbon radical optionally interrupted by non-adjacent oxygen atoms,
Y each is the same or different and is a halogen atom, pseudohalogen radical, Si-N-bonded amine radical, amide radical, oxime radical, aminoxy radical or acyloxy radical,
a is 0, 1, 2 or 3, preferably 1 or 2,
b is 0, 1, 2 or 3, preferably 0, 1 or 2, more preferably 0, and
c is 0, 1, 2 or 3, preferably 0 or 1, more preferably 0,
with the proviso that the sum of a+b+c is less than or equal to 4 and at least two condensable radicals ($OR^3$) are present per molecule,
    (B) organosiloxane crosslinker comprising units of the formula (I),
    (C) at least one crosslinker different from B, and
    (D) condensation catalyst(s).

8. The crosslinkable composition of claim 5 further comprising one or more of filler(s), adhesion promoter(s), or plasticizer(s).

9. The crosslinkable composition of claim 7 further comprising one or more of filler(s), adhesion promoter(s), or plasticizer(s).

10. The crosslinkable composition of claim 5, wherein at least one crosslinker (B) is selected from the group consisting of
(MeO)SiMe₂O(SiMe₂O)₁₋₁₃SiMe₂(OMe),
(EtO)SiMe₂O(SiMe₂O)₁₋₁₃SiMe₂(OEt),
(MeO)₂SiMeO(SiMe₂O)₁₋₁₃SiMe₂(OMe), (MeO)₃SiO(SiMe₂O)₁₋₁₃SiMe₂(OMe),
(MeO)₂SiMeO(SiMe₂O)₁₋₁₃SiMe(OMe)₂, (MeO)²SiMeO(SiMe₂O)₁₋₈Si(OMe)₃, (MeO)₃SiO(SiMe₂O)₁₋₈Si(OMe)₃,
(MeO)SiMe₂O(SiMe₂O)₁₋₆SiMe(OSi(OMe)Me₂)₂,
(MeO)SiMe₂O(SiMe₂O)₁₋₇SiMe(OMe)-OSiMe₂(OMe),
(MeO)SiMe₂O(SiMe₂O)₁₋₆Si(OMe)(OSi(OMe)Me₂)₂,
(MeO)SiMe₂O(SiMe₂O)₁₋₇Si(OMe)₂-OSiMe₂(OMe), and
(MeO)SiMe₂O(SiMe₂O)₁₋₅Si(OSi(OMe)Me₂)₃, where Me is a methyl radical and Et is an ethyl radical.

11. A molding produced by crosslinking the composition of claim 1.

12. The molding of claim 11 which is a moisture cured sealant.

13. The crosslinkable composition of claim 2, wherein the X radical is an organyloxy radical —OR¹ where R¹ is a monovalent, optionally substituted hydrocarbon radical which may be interrupted by non-adjacent oxygen atoms.

14. The crosslinkable composition of claim 2, wherein crosslinkers (B) have a flashpoint of from 15 to 200° C., determined in accordance with DIN 51 755.

15. The crosslinkable composition of claim 2, comprising
(A) organosilicon compound(s) having at least two condensable groups,
(B) crosslinker comprising units of the formula (I),
(C) optionally, further crosslinkers, and
(D) condensation catalyst.

16. The crosslinkable composition as claimed in claim 2, comprising:
(A) organosilicon compounds containing units of the formula (III), $$R^2_a(OR^3)_b Y_c SiO_{(4-a-b-c)/2} \quad (III)$$

where
R² each is the same or different and is an optionally substituted hydrocarbon radical optionally be interrupted by non-adjacent oxygen atoms,
R³ each is the same or different and is a hydrogen atom or a monovalent, optionally substituted hydrocarbon radical optionally interrupted by non-adjacent oxygen atoms,
Y each is the same or different and is a halogen atom, pseudohalogen radical, Si-N-bonded amine radical, amide radical, oxime radical, aminoxy radical or acyloxy radical,
a is 0, 1, 2 or 3, preferably 1 or 2,
b is 0, 1, 2 or 3, preferably 0, 1 or 2, more preferably 0, and
c is 0, 1, 2 or 3, preferably 0 or 1, more preferably 0,
with the proviso that the sum of a+b+c is less than or equal to 4 and at least two condensable radicals (OR³) are present per molecule,
(B) organosiloxane crosslinker comprising units of the formula (I),
(C) at least one crosslinker different from B, and
(D) condensation catalyst(s).

17. The crosslinkable composition of claim 2,
wherein at least one crosslinker (B) is selected from the group consisting of (MeO)SiMe₂O(SiMe₂O)₁₋₁₃SiMe₂(OMe),
(EtO)SiMe₂O(SiMe₂O)₁₋₁₃SiMe₂(OEt),
(MeO)₂SiMeO(SiMe₂O)₁₋₁₃SiMe₂(OMe), (MeO)₃SiO(SiMe₂O)₁₋₁₃SiMe₂(OMe),
(MeO)₂SiMeO(SiMe₂O)₁₋₁₃SiMe(OMe)₂,
(MeO)₂SiMeO(SiMe₂O)₁₋₈Si(OMe)₃, (MeO)₃SiO(SiMe₂O)₁₋₈Si(OMe)₃,
(MeO)SiMe₂O(SiMe₂O)₁₋₆SiMe(OSi(OMe)Me₂)₂,
(MeO)SiMe₂O(SiMe₂O)₁₋₇SiMe(OMe)—OSiMe₂(OMe),
(MeO)SiMe₂O(SiMe₂O)₁₋₆Si(OMe)(OSi(OMe)Me₂)₂,
(MeO)SiMe₂O(SiMe₂O)₁₋₇Si(OMe)₂-OSiMe₂(OMe), and
(MeO)SiMe₂O(SiMe₂O)₁₋₅Si(OSi(OMe)Me₂)₃, where Me is a methyl radical and Et is an ethyl radical.

18. The composition of claim 1, further comprising a catalyst, wherein the catalyst consists of one or more catalysts which catalyze the condensation of silicon-bonded —OR³ groups in the presence of moisture.

19. In a moisture curable substantially water-free, storage-stable crosslinkable storage stable composition containing a condensation crosslinkable polymer and an organosilicon crosslinker, the improvement comprising selecting as crosslinker(s) (B), at least one linear or branched organosiloxane comprising units of the formula $$R_d X_e SiO_{(4-d-e)/2} \quad (I)$$

where
R each is the same or different and is a monovalent hydrocarbon radical optionally interrupted by non-adjacent oxygen atoms,
X each is the same or different and is a hydrolyzable radical,
d is 0, 1, 2 or 3 and
e is 0, 1, 2 or 3,
with the proviso that the sum of d+e is ≦3, from 3 to 15 units of the formula (I) are present per molecule, at least two X radicals are present per molecule, and at least one unit of the formula (I) where d=2 and e=0 is present per molecule,
wherein the composition further comprises a catalyst, the catalyst consisting of one or more catalysts which catalyze the condensation of silicon-bonded —OR³ groups in the presence of water, where R³ each is the same or different and is a hydrogen atom or a monovalent, optionally substituted hydrocarbon radical optionally interrupted by non-adjacent oxygen atoms, and wherein the condensation crosslinkable polymer contains on average at least two silicon-bonded —OR³ groups.

20. The crosslinkable composition of claim 1, wherein the crosslinker (B) comprises at least one compound of the formula (II)

$$[XR_2SiO_{1/2}-]_n[X_k R_{3-k}SiO_{1/2}-]_p[R_2SiO_{2/2}-]_f[X_m R_{2-m}SiO_{2/2}-]_g[X_r R_{1-r}SiO_{3/2}-]_h[SiO_{4/2}-]_i$$

where
k is 2 or 3,
m is 1 or 2,
r is 0 or 1,
n is 0 or an integer from 1 to 6,
p is 0 or an integer from 1 to 2,
f is an integer from 1 to 13,
g is 0 or 1,
h is 0 or 1,
i is 0 or 1,
with the proviso that the sum of (n+p+f+g+h+i) is from 3 to 15.

* * * * *

UNITED STATES PATENT AND TRADEMARK OFFICE
CERTIFICATE OF CORRECTION

| | | |
|---|---|---|
| PATENT NO. | : 7,339,012 B2 | Page 1 of 1 |
| APPLICATION NO. | : 11/068597 | |
| DATED | : March 4, 2008 | |
| INVENTOR(S) | : Marko Prasse | |

It is certified that error appears in the above-identified patent and that said Letters Patent is hereby corrected as shown below:

Column 10, Line 33, Claim 7:

Delete "be"

Column 11, Line 35, Claim 16:

Delete "be"

Signed and Sealed this

Fifth Day of August, 2008

JON W. DUDAS
*Director of the United States Patent and Trademark Office*